(12) United States Patent
Carrier

(10) Patent No.: US 8,468,626 B2
(45) Date of Patent: Jun. 25, 2013

(54) CAB SLEEPER

(76) Inventor: Ralph Carrier, Comstock Park, MI (US)

( * ) Notice: Subject to any disclaimer, the term of this patent is extended or adjusted under 35 U.S.C. 154(b) by 0 days.

(21) Appl. No.: 13/278,633

(22) Filed: Oct. 21, 2011

(65) Prior Publication Data

US 2013/0097782 A1    Apr. 25, 2013

(51) Int. Cl.
*A47B 7/02* (2006.01)
*A47B 7/00* (2006.01)

(52) U.S. Cl.
USPC ........................... 5/607; 5/608; 5/610

(58) Field of Classification Search
USPC .................... 5/118, 607, 608, 610; 248/184.1
See application file for complete search history.

(56) References Cited

U.S. PATENT DOCUMENTS

| | | | | |
|---|---|---|---|---|
| 4,356,577 A | * | 11/1982 | Taylor et al. | 5/608 |
| 6,640,363 B1 | * | 11/2003 | Pattee et al. | 5/601 |
| 6,718,574 B1 | | 4/2004 | Bradley et al. | |
| 6,993,798 B1 | | 2/2006 | Roberts | |
| 7,123,201 B2 | * | 10/2006 | Caudle | 343/709 |
| 7,146,662 B1 | | 12/2006 | Pollard et al. | |
| 7,490,572 B2 | * | 2/2009 | Grober | 114/191 |

* cited by examiner

*Primary Examiner* — Robert G Santos
*Assistant Examiner* — Richard G Davis
(74) *Attorney, Agent, or Firm* — Robert J. Sayfie

(57) ABSTRACT

The present invention is directed to a self-leveling sleeper having an interior gimbals member pivotally connected to an exterior gimbals member via a second pivoting means. The exterior gimbals member has a first pivoting means oriented substantially perpendicular with respect to said second pivoting means. An attitude sensor and correction sending unit is operably connected to control the displacement of the exterior gimbals member and interior gimbals member to displace a mattress platform to either a stowed position or a level position.

5 Claims, 6 Drawing Sheets

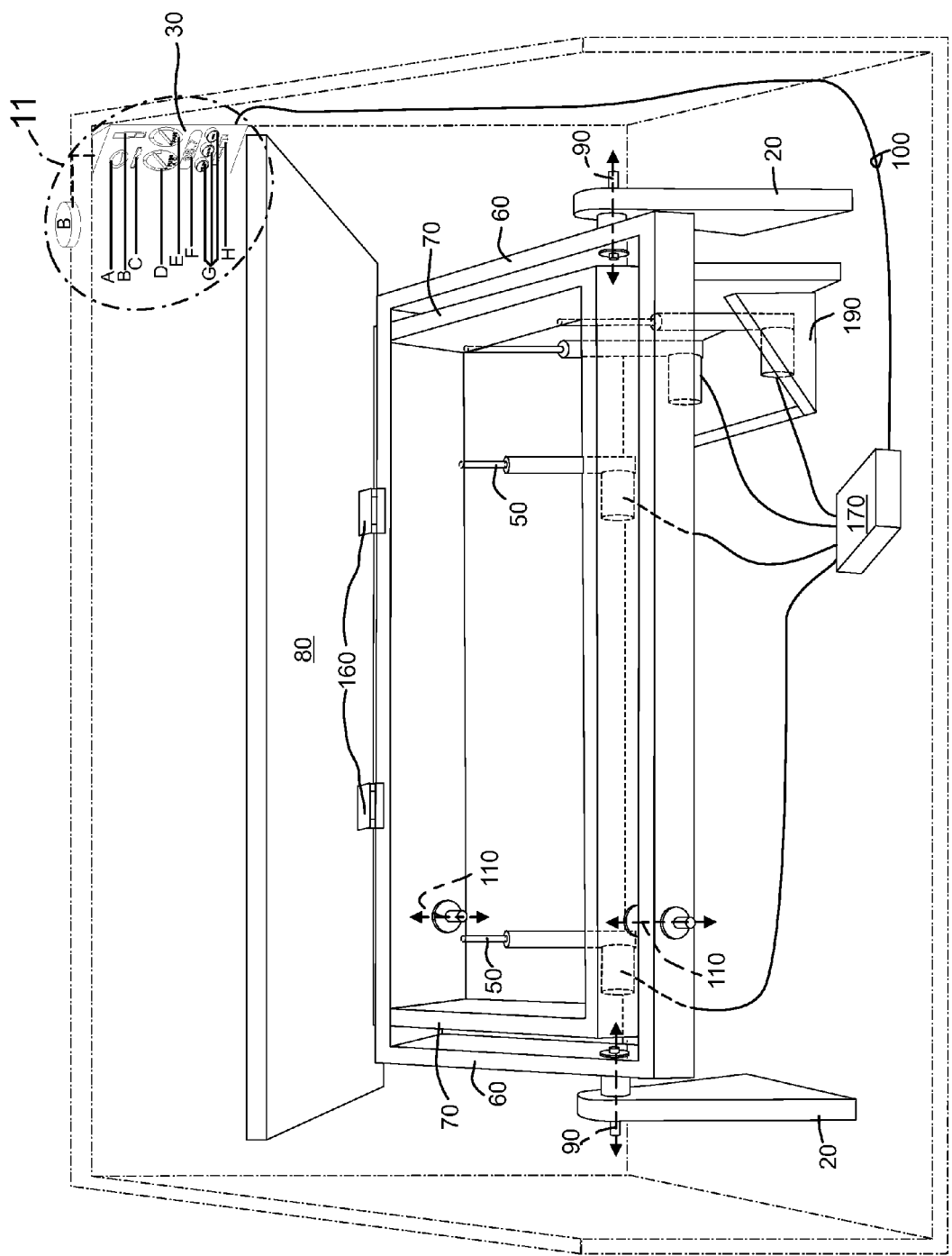

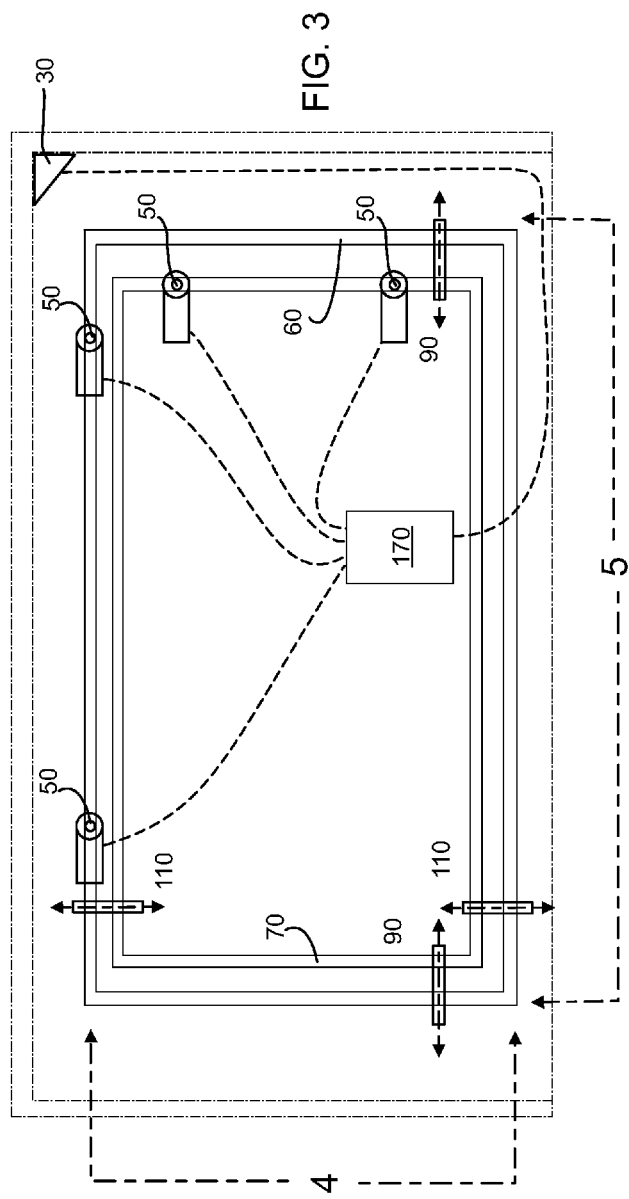
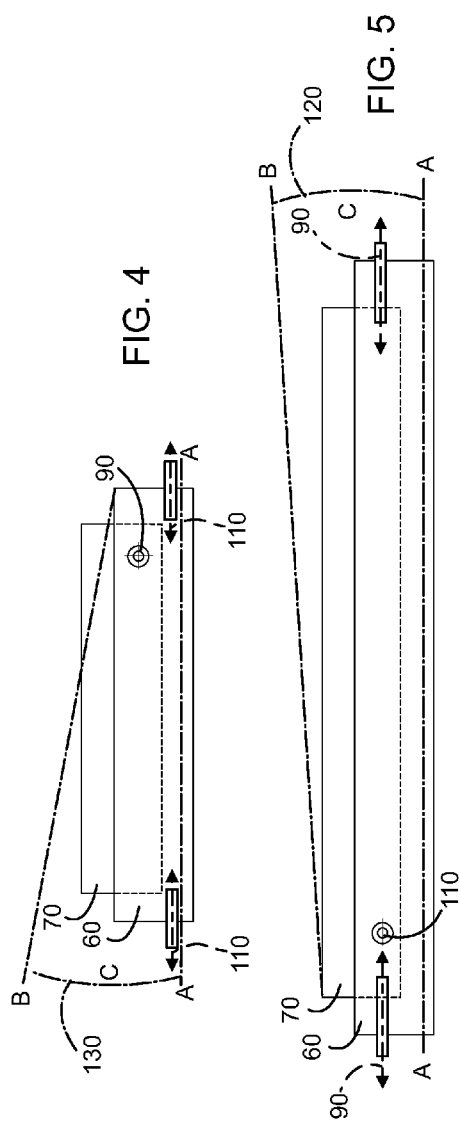

CAB SLEEPER

FIELD OF THE INVENTION

This invention relates to an apparatus that levels a bed in a truck cab.

BACKGROUND OF THE INVENTION

U.S. Pat. No. 7,146,662 to Pollard et al. discloses a self-leveling bed support frame with an adjustable seat back assembly.

The main purpose of the device is to either automatically or manually level a bed in the sleeper cabin of a semi-truck while parked on the shoulder of a highway in an unlevel position.

U.S. Pat. No. 6,505,363 to Davis provides a device and housing which adjusts the plane of a mattress, primarily in the sleeper cabin of semi-trucks.

The primary purpose of the invention is to adjust the plane of a mattress device within a semi-truck sleeper cabin.

U.S. Pat. No. 6,671,900 to Davis discloses a bed leveler/adjuster for primary use within a semi-truck.

The primary purpose of the device is to provide a frame which levels or adjusts the head and foot ends of the mattress, or to allow the user the ability to recline in several different positions.

U.S. Pat. No. 6,993,798 to Roberts provides a method and apparatus for leveling a transportable bed system.

The primary purpose of this invention is to provide a lightweight, adjustable, easily transportable mattress that allows for manual adjustment in order to level the sleeping surface by expandable, gaseous fluid cushions at each of its four corners. Its functionality is well-suited to the sleeper cabin of a semi-truck.

U.S. Pat. No. 6,718,574 to Bradley et al. discloses a bunk leveling support assembly.

The primary purpose of the invention is to provide a level sleeping plane for semi-truck drivers within the sleeper cabins of semi-trucks, while still allowing for storage space beneath the apparatus. The device utilizes sensors which allows for automatic leveling.

Multiple embodiments of the system are disclosed herein. It will be understood that other objects and purposes of the invention, and variations thereof, will be apparent upon reading the following specification and inspecting the accompanying drawings.

REFERENCE NUMERALS LIST 10 self-leveling sleeper
20 support
30 controller
40 motor
50 extender
60 exterior gimbals member
70 interior gimbals member
80 mattress platform
90 first pivoting means
100 conduit
110 second pivoting means
120 second radius
130 first radius
140 power source
160 hinge
170 attitude sensor and correction sending unit
180 mattress
190 bracket motor housing

SUMMARY OF THE INVENTION

One aspect of the present invention is a self-leveling sleeper (10), comprising: an interior gimbals member (70) pivotally connected to an exterior gimbals member (60) via a second pivot means (110); said exterior gimbals member (60) capable of pivoting along an axis that is substantially perpendicular to said second pivot means (110) via a first pivot means (90); a mattress platform (80) disposed on said interior gimbals member (70); an extender (50) connected to said interior gimbals member (70); an extender (50) connected to said exterior gimbals member (60); and an attitude sensor and correction sending unit (170) operably connected to a motor (40) to displace said extender (50) to position said mattress platform (80) in a substantially horizontal plane with respect to a pre-calibrated flat and level orientation.

Another aspect of the present invention is a self-leveling sleeper (10), comprising: an interior gimbals member (70) pivotally connected to an exterior gimbals member (60) via a second pivot means (110); said exterior gimbals member (60) capable of pivoting along an axis that is substantially perpendicular to said second pivot means (110) via a first pivot means (90); a mattress platform (80) disposed on said interior gimbals member (70); an extender (50) connected to said interior gimbals member (70); an extender (50) connected to said exterior gimbals member (60); an attitude sensor and correction sending unit (170) operably connected to two motors (40) capable of displacing two extenders (50) that are connected to said interior gimbals member (70), and two other motors (40) capable of displacing two other extenders (50) connected to said exterior gimbals member (60); to position said mattress platform (80) in a substantially horizontal plane with respect to a pre-calibrated flat and level orientation; a support (20) that receives a first pivot means (90); a controller (30) operably connected to said attitude sensor and correction sending unit (170); and a power source (140) operably connected to said attitude sensor and correction sending unit (170) and a controller (30); wherein said controller (30) has a gimbals adjustment (H) wherein an operator can actuate said attitude sensor and correction sending unit (170) to displace said mattress platform (80) is a stowed position and a level position.

These and other features, aspects and advantages of the present invention will become better understood with reference to the following drawings, description and claims.

BRIEF DESCRIPTION OF THE DRAWINGS

FIG. 2 is another pictorial view of one embodiment of the present invention;

FIG. 5 is a pictorial of one embodiment of the power source and motor configuration of the present invention;

FIG. 10 is another pictorial view of one embodiment of the present invention; and FIG. 11 is a pictorial view of the controller.

DETAILED DESCRIPTION OF THE INVENTION

Figure 1:
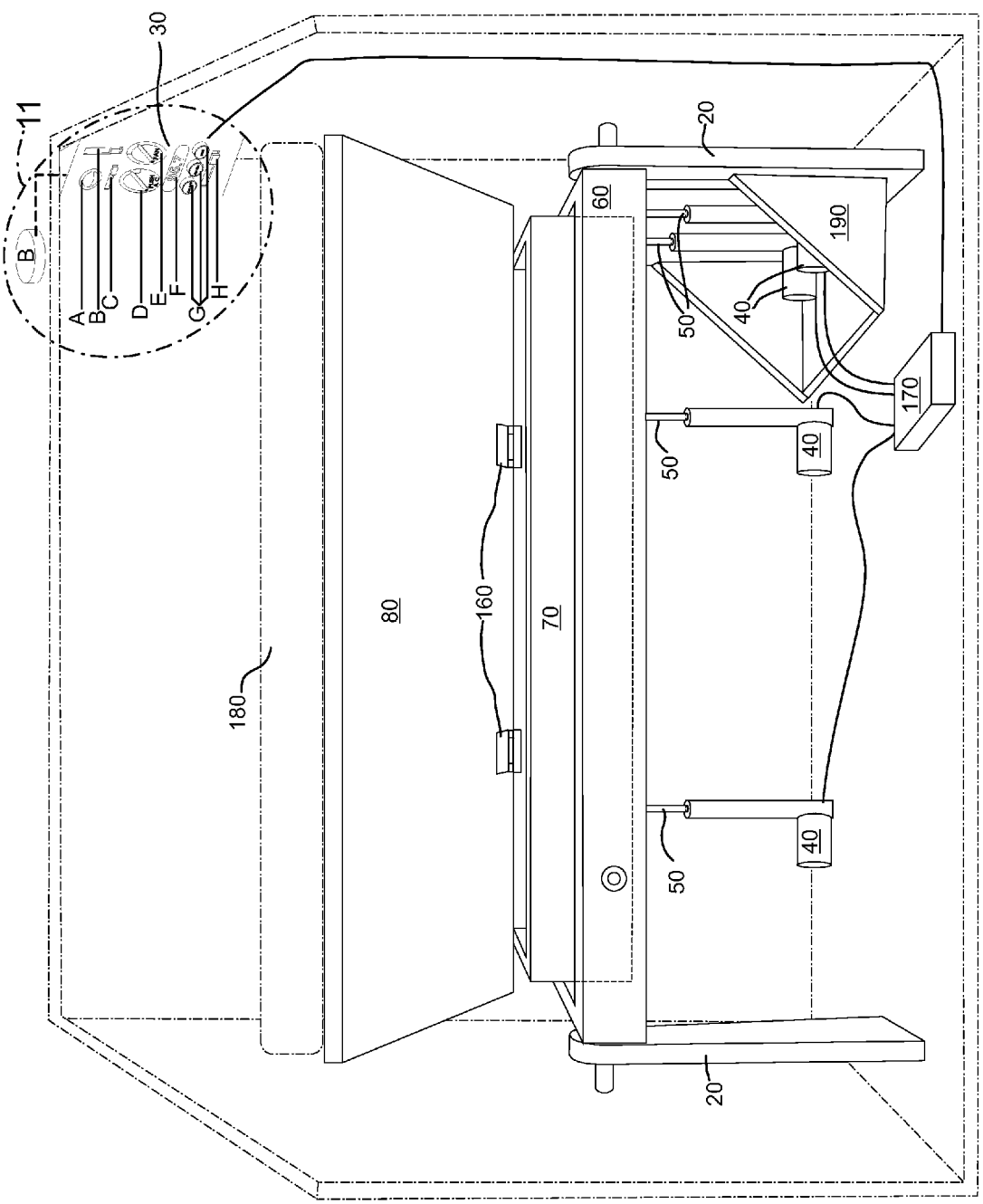
FIG. 1 is a pictorial view of one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

FIG. 1 illustrates one embodiment of the present invention 10, which may be referred to as a cab sleeper 10. It can displace, reposition and maintain a mattress platform 80 in a substantially horizontal plane so that the mattress platform 80 is flat relative to a pre-calibrated flat and level orientation for ease of sleeping. The cab sleeper 10 may be installed in a sleeper berth compartment of a truck cab, such as the cab of a semi-truck.

In one embodiment, the mattress platform 80 may be hingedly connected to an interior gimbals member 70. The interior gimbals member 70 may be pivotally connected via a second pivoting means 110 (as seen in FIG. 2), to an exterior gimbals member 60. In one embodiment the second pivoting means 110 may be disposed leftwardly relative to the center of the interior gimbals member 70. Thus the pitch of the mattress platform 80 can be controlled by pivoting of the interior gimbals member 70.

An extender 50 may have an upper end connected to a bottom surface of the interior gimbals member 70, and a lower end that is connected to a means of displacing 40 the extender 50 upwardly and downwardly to control the pitch of the mattress platform 80. In one embodiment the means of displacing 40 may be a motor 40. In one embodiment, there may be two extenders 50 connected to the interior gimbals member 70 to pivot the interior gimbals member 70 about the second pivoting means 110. In one embodiment, the extenders 50 may be connected to the interior gimbals member 70 rightwardly of the center of the interior gimbals member 70.

The motor 40 may be secured to a floor a bracket motor housing 190, which motor housing 90 is connected to the interior gimbals member 70. Thereby when the exterior gimbals member 60 is pivoted about the first pivoting means 90 the bracket motor housing 190, being connected to the exterior gimbals member 60 also moves. This way the interior gimbals member 70 may always be connected to extenders 50 to displace the interior gimbals member 70 upwardly and downwardly, as best seen in FIG. 10.

FIG. 1 also illustrates an embodiment of a controller 30, which is further illustrated in FIG. 11. The controller 30 may be disposed within arms reach of someone sleeping on a mattress 180.

FIG. 2 also illustrates another embodiment of a controller 30. FIG. 2 is a pictorial of an embodiment of the present invention 10. The first pivoting means 90 may be an axle that is oriented in a substantially horizontal plane. The axle may be rotatably disposed through a support 20 and the exterior gimbals member 60.

FIG. 5 illustrates one embodiment of the configuration of the motors 40 being in operable connection with a power source 140, and the power source 140 being in operable connection with the controller 30.

Figure 6:
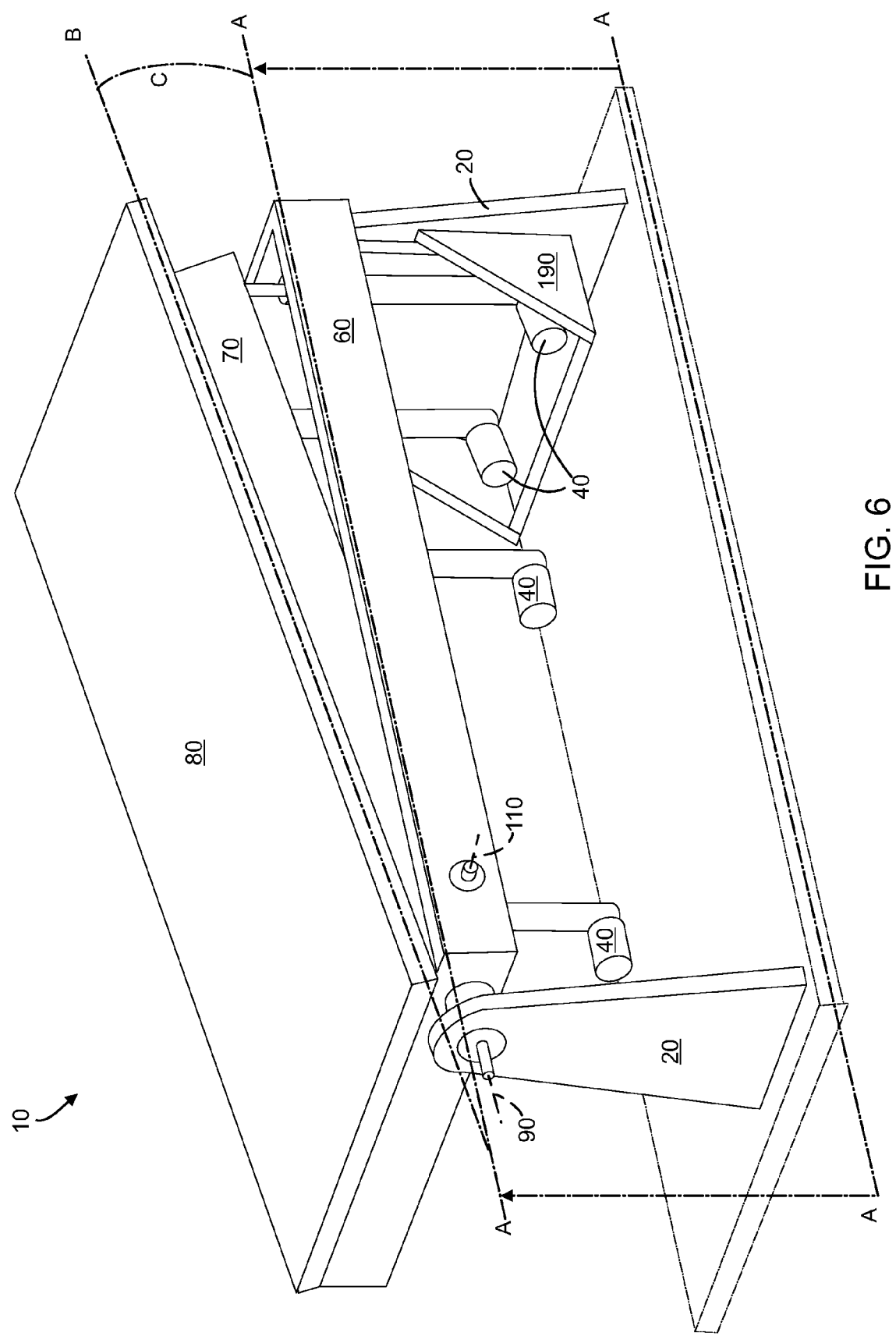
FIG. 6 is another pictorial view of one embodiment of the present invention.

FIG. 6 illustrates a top view of one embodiment of the present invention 10. The first pivot means 90 is illustrated as being disposed through the interior gimbals member 70 and the exterior gimbals member 60 so as to allow the interior gimbals member 70 to pivot via the first pivot means 90 with respect to the exterior gimbals member 60. FIG. 6 illustrates two such first pivoting means 90 in linear alignment with each other, and near the front of each respective gimbals member 70, 60.

FIG. 6 also illustrates the second pivot means 110 which may be oriented substantially perpendicular with respect to the first pivot means 90. The second pivot means 110 may be disposed through the interior gimbals member 70 and the exterior gimbals member 60 so as to allow the interior gimbals member 70 to pivot about the second pivot means 110 with respect to the exterior gimbals member 60. There may be two second pivot means 110 aligned with each other.

FIG. 6 also illustrates how an extender 50 may be aligned under the exterior gimbals member 60 to displace the exterior gimbals member 50. And an extender 50 may also be aligned under the interior gimbals member 70 to displace the interior gimbals member 70.

Figure 7:
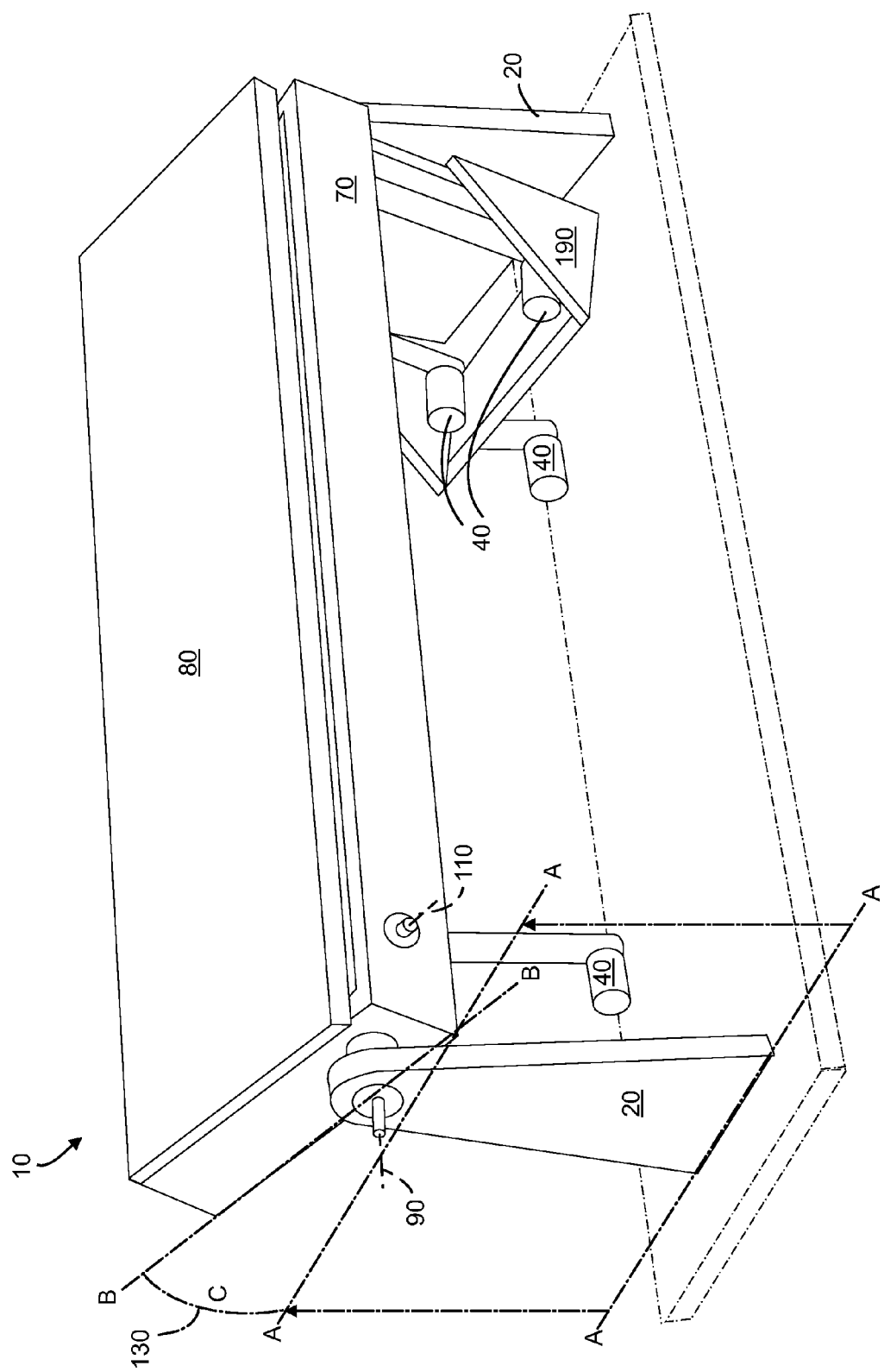
FIG. 7 is view of FIG. 6 along line 7-7.

FIG. 7 illustrates a range in which the exterior gimbals member 60 may be displaced, by referencing the first radius 130, via the first pivoting means 90.

Figure 8:
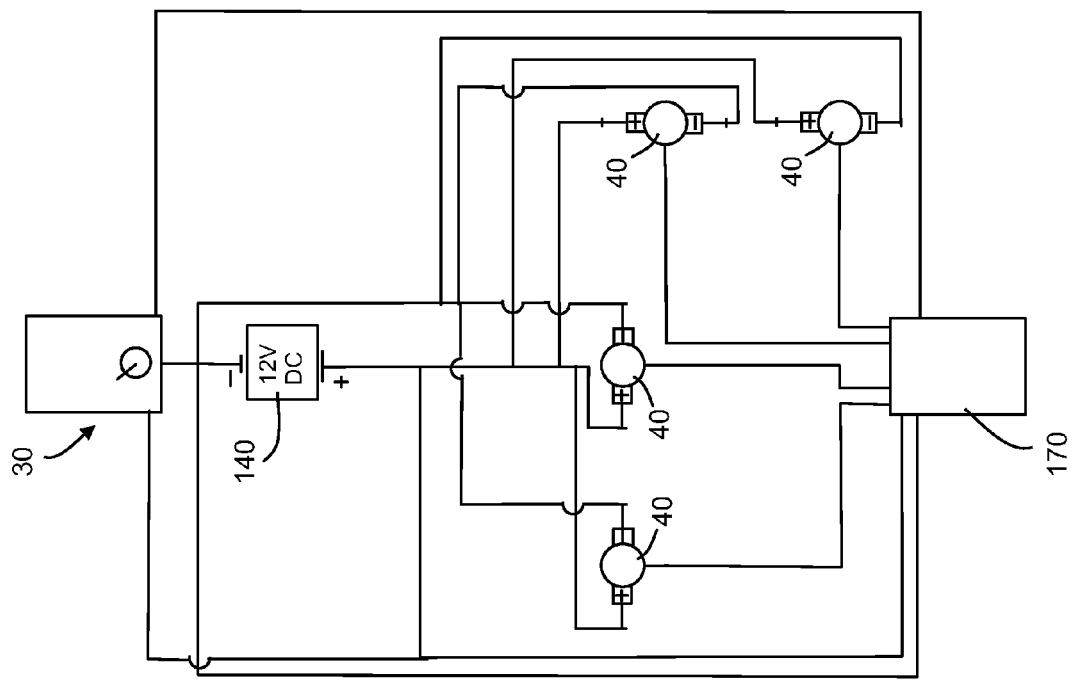
FIG. 8 is a view of FIG. 6 along line 8-8.

FIG. 8 illustrates a range in which the interior gimbals member 70 may be displaced, by referencing the second radius 120, via the second pivoting means 110.

Figure 9:
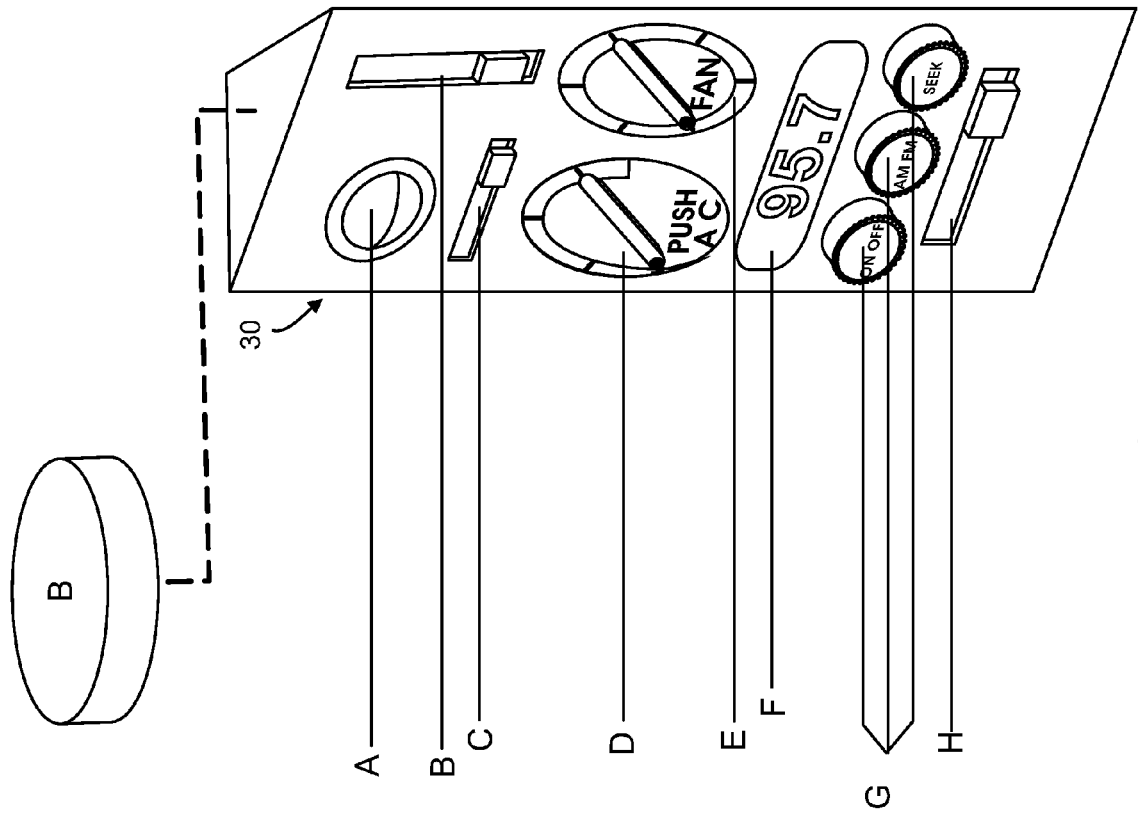
FIG. 9 is another pictorial view of one embodiment of the present invention.

FIG. 9 illustrates one embodiment that illustrates the extenders 50 that may be connected to the interior gimbals member 70, and may be disposed in the bracket motor housing 190, These extenders 50 are displaced upwardly or downwardly, causing the interior gimbals member 70 to also become displaced upwardly or downwardly, respectively, on the right side as the interior gimbals member 70 is pivoting via a second pivot means 110. The exterior gimbals member 60 may remain stationary during this process.

FIG. 10 illustrates an embodiment of the present invention 10 where both extenders 50 in contact with the exterior gimbals member 60 are displaced upwardly, which causes the exterior gimbals member 60 to displace upwardly as it pivots about the first pivot means 90. The extenders 50 also may be displaced downwardly to cause the exterior gimbals member 60 to displace downwardly.

FIG. 11 illustrates one embodiment of the control panel 30 of the present invention 10. Reference letter A may be a map light. Reference letter B may be a dome light control. Reference letter C may be a map light control. Reference letter D may be a temperature control. Reference E may be a fan control. Reference letter G may be radio controls.

Reference letter H may be a single gimbals control to activate the gimbals attitude sensor and correction sending unit 170. For example, sliding the control H to the left may cause all motors 40 to lower, and thus lower the exterior gimbals member 60, and interior gimbals member 70 to place the self-leveling sleeper 10 in a stowed position. Sliding the control H to the right may cause the gimbals attitude sensor and correction sending unit 170 to activate, and to sense the level of the mattress platform 80, and if the mattress platform 80 is not flat with respect to a pre-calibrated flat and level orientation, the unit 170 is causes the respective motors to displace the extenders as need be to position the mattress platform 80 in a level position. The attitude sensor and correction sending unit 170 may also be referred to as an inclinometer or tilt sensor. A suitable attitude sensor and correction sending unit 170 may be model T5 or T6 by U.S. Digital, which may be seen at http://usdigital.com/products/inclinometers/incremental/t5 or http://usdigital.com/products/inclinometers/incremental/t6, or the 3DM® by MicroStrain®, and seen at http://microstrain.com/3dm.aspx? gclid=CIa9jdLpz6oCFQvCKgod3nHu1g.

It should be understood, of course, that the foregoing relates to exemplary embodiments of the invention and that modifications may be made without departing from the spirit and scope of the invention as set forth in the following claims.

I claim:

1. A self-leveling sleeper (10), secured inside a truck cab, comprising:
    an interior gimbals member (70) pivotally connected to an exterior gimbals member (60) via a second pivot means (110);
    said second pivot means (110) disposed leftwardly relative to the center of the interior gimbals member (70);
    said exterior gimbals member (60) capable of pivoting along an axis that is substantially perpendicular to said second pivot means (110) via a first pivot means (90);
    said first pivoting means (90) disposed near a front of each respective gimbals member (70), (60);
    a support (20) that receives said first pivoting means, said support disposed inside a truck cab;
    a mattress platform (80) disposed on said interior gimbals member (70);
    an extender (50) connected to said interior gimbals member (70);
    said extender (50) disposed inside a truck cab;
    an extender (50) connected to said exterior gimbals member (60); and
    an attitude sensor and correction sending unit (170) operably connected to a motor (40) to displace said extender (50) to position said mattress platform (80) in a substantially horizontal plane with respect to a pre-calibrated flat and level orientation.

2. The apparatus of claim 1, further comprising:
    a controller (30) operably connected to said attitude sensor and correction sending unit (170).

3. The apparatus of claim 1, further comprising:
    two motors (40) capable of displacing two extenders (50) that are connected to said interior gimbals member (70), and two other motors (40) capable of displacing two other extenders (50) connected to said exterior gimbals member (60).

4. The apparatus of claim 1, further comprising:
    a power source (140) operably connected to said attitude sensor and correction sending unit (170) and a controller (30).

5. The apparatus of claim 4, wherein said controller (30) has a gimbals adjustment (H) wherein an operator can actuate said attitude sensor and correction sending unit (170) to displace said mattress platform (80) in a stowed position and a level position.

* * * * *